E. DUNLAP.
YIELDING MOUNT FOR PLOWS AND OTHER TOOLS.
APPLICATION FILED OCT. 10, 1918.

1,313,802.

Patented Aug. 19, 1919.
4 SHEETS—SHEET 1.

WITNESSES
Frederick Diehl.
E. B. Marshall

INVENTOR
Elon Dunlap
BY
ATTORNEYS

E. DUNLAP.
YIELDING MOUNT FOR PLOWS AND OTHER TOOLS.
APPLICATION FILED OCT. 10, 1918.

1,313,802.

Patented Aug. 19, 1919.
4 SHEETS—SHEET 2.

WITNESSES
Frederick Diehl.
E. B. Marshall

INVENTOR
Elon Dunlap
BY
ATTORNEYS

E. DUNLAP.
YIELDING MOUNT FOR PLOWS AND OTHER TOOLS.
APPLICATION FILED OCT. 10, 1918.

1,313,802.

Patented Aug. 19, 1919.
4 SHEETS—SHEET 3.

WITNESSES
Frederick Diehl.
E. B. Marshall

INVENTOR
Elon Dunlap
BY
ATTORNEYS

E. DUNLAP.
YIELDING MOUNT FOR PLOWS AND OTHER TOOLS.
APPLICATION FILED OCT. 10, 1918.
1,313,802.
Patented Aug. 19, 1919.
4 SHEETS—SHEET 4.
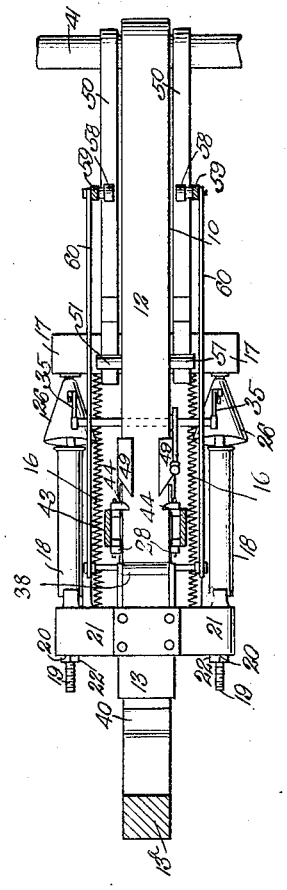
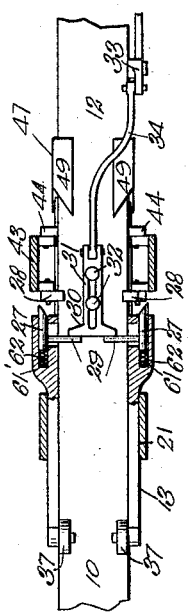
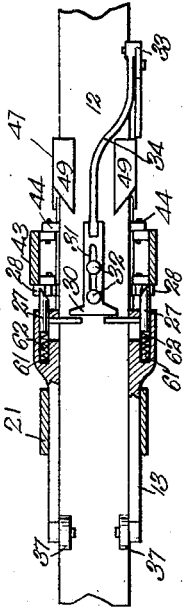
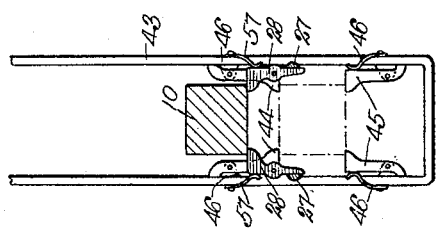
WITNESSES
Frederick Diehl.
E. B. Marshall.
INVENTOR
Elon Dunlap
BY
ATTORNEYS

UNITED STATES PATENT OFFICE.

ELON DUNLAP, OF DIAMOND SPRINGS, CALIFORNIA.

YIELDING MOUNT FOR PLOWS AND OTHER TOOLS.

1,313,802. Specification of Letters Patent. Patented Aug. 19, 1919.

Application filed October 10, 1918. Serial No. 257,646.

*To all whom it may concern:*

Be it known that I, ELON DUNLAP, a citizen of the United States, and a resident of Diamond Springs, in the county of El Dorado and State of California, have invented a new and Improved Yielding Mount for Plows and other Tools, of which the following is a full, clear, and exact description.

This invention has for its object to provide a yielding mount for plows and other tools which will enable the operator to raise the plow above the ground by the pull on the draw bar or the forward movement of the frame. The plow may be supported above the ground as long as desired by means provided and may be returned to operative position by movement of an operating member.

This invention is an improvement on a yielding mount which was patented in the United States on March 7th, 1916, under Number 1,174,699, many of the features shown in the drawings corresponding with the subject matter of the said issued patent.

Additional objects of the invention will appear in the following specification in which the preferred form of my invention is described.

In the drawings similar reference characters refer to similar parts in all the views, in which—

Fig. 4 is a sectional view on the line 4—4 of Fig. 1;

Fig. 5 is a sectional view on the line 5—5 of Fig. 2;

Fig. 6 is a sectional view similar to that shown in Fig. 5, but with the wedges on the carriage freed to engage the pawls which are provided to support the beam in raised position; and Fig. 7 is a sectional view on the line 7—7 of Fig. 2.

Figure 1:
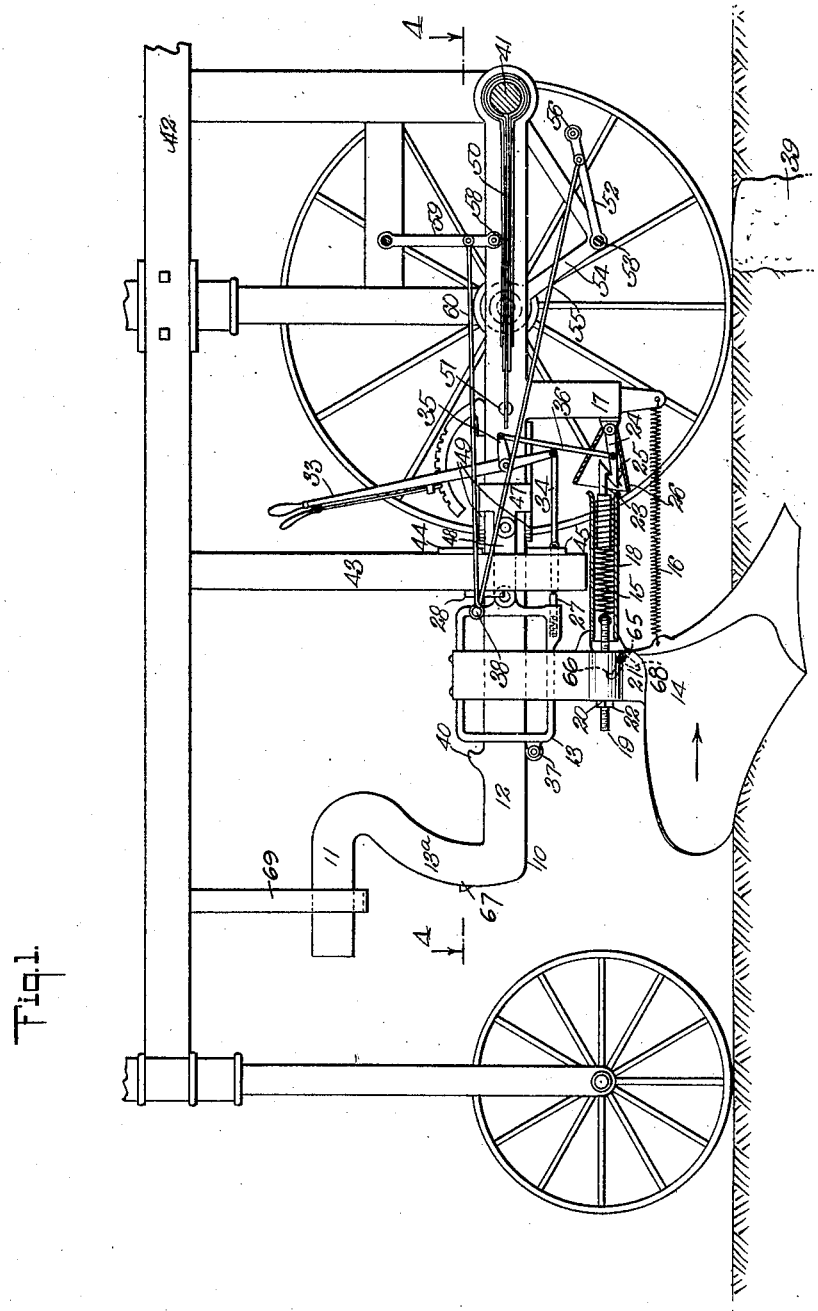
Figure 1 is a side elevation of the invention with the plow in operative position.
Figure 2:
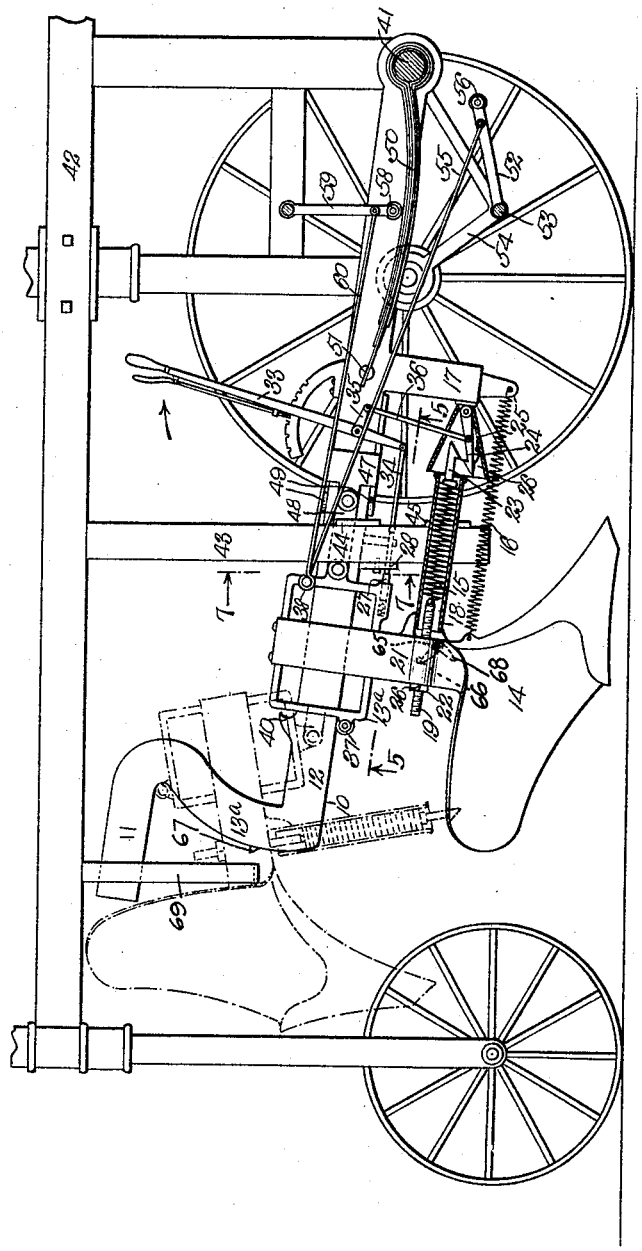
Fig. 2 is a side view similar to that shown in Fig. 1, but with the plow supported above the ground.

By referring to the drawings, it will be seen that the beam 10 is provided with portions 11 and 12 which are disposed substantially parallel to each other, the portion 11 being disposed above the portion 12, and these portions being connected by a curved portion 13, all as set forth in the United States patent referred to.

A carriage 13 is mounted to slide longitudinally on the beam 10, and this carriage is provided for supporting a plow 14. The carriage 13 is held yieldingly forward in operative position by means of two springs 15 and 16, the springs 16 connecting at all times the carriage 13 at the plow 14 with an arm 17 depending from the beam 10. The spring 15 is disposed within a collar or sleeve 18 which is secured to the carriage 13 and is adjusted relatively to the carriage by means of the screw 19 which is secured to the rear end of the spring 15, and is disposed in a threaded orifice 20 in the depending member 21 on the carriage.

A nut 22 serves to hold the bolt 19 in adjusted position. At its forward end, the spring 15 is provided with a hook 23 which normally engages a companion hook 24 disposed in a cone 25 and secured to the arm 17. The companion hook 24 is held yieldingly upward by means of a spring 26.

It will be understood that under normal conditions the hook 23 engages the companion hook 24, so that the carriage 13 with the plow 14 will be held in forward operative position on the beam 10, but by means which I will now describe, the companion hook 24 may be moved downwardly relatively to the hook 23, so that the carriage 13 and the plow 14 will merely be held forward under the influence of the spring 16 which is not sufficient to hold the carriage 13 in position when the plow is in the ground. Consequently, when the hook 23 is disengaged from the hook 24 and the machine is moved forwardly, the forward movement of the carriage 13 will be retarded by means of the engagement of the plow 14 with the ground which will cause the carriage 13 to assume a rearward position on the beam 10 and the beam 10 will be raised by means which I will shortly describe.

In order to prevent a return forward movement of the plow 14 before the beam 10 is fully raised, a catch 65 is pivoted between the parts of the depending member 21, and the arm 66 of this catch 65 will engage the boss 67 on the beam 10 and the plow will be held rearwardly thereby until the other arm 68 of the catch 65 engages the bottom of the guideway 69 which will free the catch 65, but only after the beam is supported by the pawls 28.

When the plow 14 is free from the ground, the spring 16 will serve to move the carriage 13 and the plow 14 forward relatively to the beam 10. However, the wedges 27 may be held out of operative position as shown in Fig. 5 of the drawings, so that they will not engage the pawls 28 which serve to support the beam 10. The said wedges have inwardly extending arms 29 which are engaged by a stop 30 which has a slot 31 in which pins 32 are disposed, said pins engaging the under side of the beam 10, so that the stop 30 has a longitudinal movement on the beam. The said stop is connected with the lever 33 by means of a curved link 34, the said lever 33 also having an arm 35 which is connected with the companion hook 24 by means of a link 36.

It will, therefore, be seen that when the operator desires to raise the plow above the ground, it is possible for him to move the lever 33 forwardly which will depress the companion hook 24 out of operative position and permit the rearward movement of the carriage 13 relatively to the beam 10, as has been stated. When the beam 10 is raised by means which I will shortly describe, the carriage 13 will be moved forwardly under the influence of the spring 16, but the beam 10 will not be permitted to descend until the lever 33 is again moved rearwardly to advance the stop 30 out of operative position and permit the wedges 27 to engage the pawls 28 and move them out of operative position as indicated in Fig. 6 of the drawings.

The carriage 13 may have several rollers for engaging the beam 10, but in most cases it will be found sufficient if there are rollers 37 at the bottom of the carriage at its rear and rollers 38 at the front of the carriage and resting on the beam 10.

Figure 3:
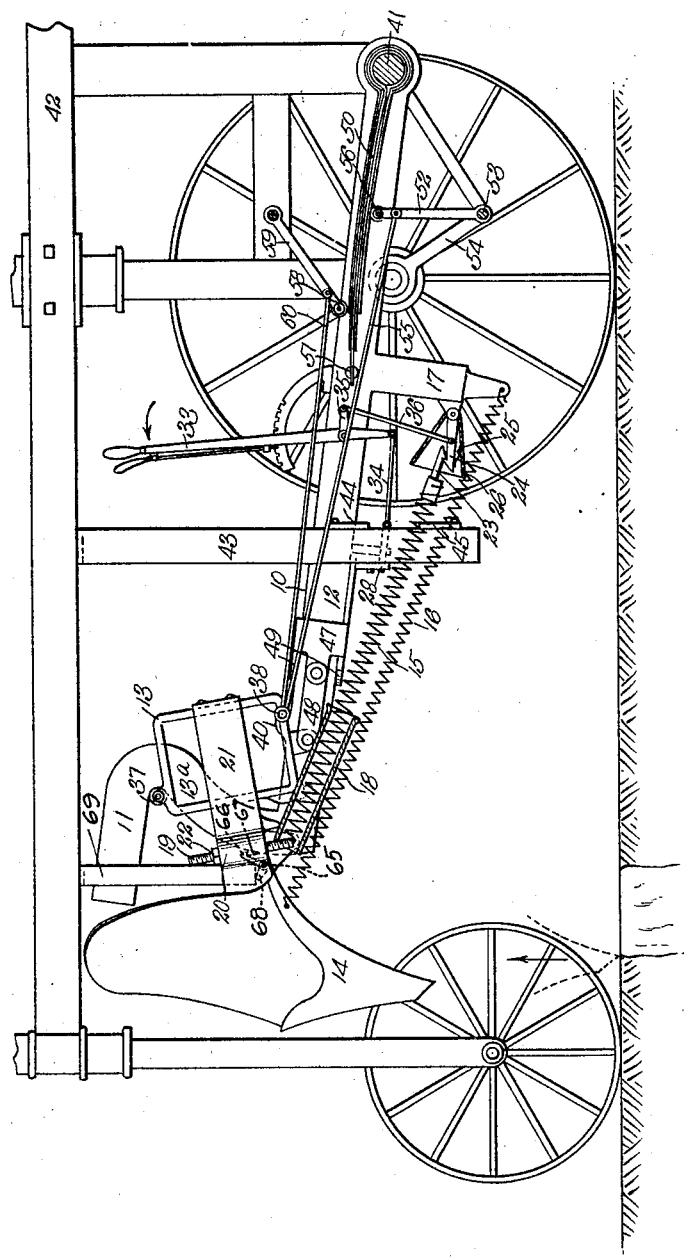
Fig. 3 is also a side elevation of the invention showing the plow which has been automatically raised above the ground to pass over an obstruction.

It will be understood that when the yielding mount is ordinarily used, the carriage 13 may be moved to a limited degree longitudinally of the beam, and that the plow 14 will be held in alinement even should the plow strike some very hard ground. Should, however, the plow 14 strike a stump 39 or other unusual obstruction, it will be moved rearwardly from normal position or until the rollers 38 strike the stop 40, at the top of the portion 12 of the beam 10. This will check the rearward movement of the upper portion of the carriage 13 and under the influence of a stump or other obstruction 39, the plow 14 will be rotated to the rear of the portion 13 of the beam 10 as indicated in Fig. 3 of the drawings. The axis of rotation of the carriage 13 and the plow 14, when the plow moves rearwardly of the portion 12 of the beam 10, is the stop 40 and the rollers 38 on the carriage 13. The beam 10 is pivoted at its forward end to a transverse stud 41 secured to members of the frame 42. The portion 12 of the beam 10 is disposed in a guideway 43. It will, therefore, be seen that any lateral movement of the beam 10 relatively to the frame 42 will be prevented. The portion 12 of the beam 10 is normally held rigid relatively to the frame 42 in the position indicated in Fig. 1 of the drawings by pawls 44 and 45. The pawls 44 engage the upper side of the portion 12 of the beam and the pawls 45 engage the bottom of the said portion 12 of the beam. These pawls 44 and 45 are held yieldingly in this position by springs 46.

Secured for sliding on the portion 12 of the beam 10, there is a sleeve 47 which is connected by links 48 with the carriage 13, so that it will be moved therewith. This sleeve 47 carries two upper and two lower wedges 49 which are disposed in front of the pawls 44 and 45 and which engage the latter to push them away from each other when the sleeve 47 is moved rearwardly with the rearward movement of the carriage 13. This being so, when the carriage 13 moves rearwardly from normal position and when the rollers 38 on the carriage engage the stop 40, the wedges 49 on the sleeve 47 free the pawls 44 and 45 from the portion 12 of the beam 10, so that the beam 10 is free to move vertically relatively to the frame 42. This freedom of movement is important in order that the plow 14 will disengage itself from a stump or other obstruction 39.

I provide one or more leaf springs 50 which are mounted on the transverse stud 41 and which are disposed rearwardly and are secured to the portion 12 of the beam 10 at 51. In connection with these springs 50, I provide an arm 52 pivoted at 53 to members 54 of the frame. This arm 52 is connected with the carriage 13 by a link 55; it being held forwardly by the said carriage 13 and the link 55 when the carriage 13 is in normal position. However, when the carriage 13 moves rearwardly out of normal position, it pulls the link 55 rearwardly thereby, bringing the roller 56 on the arm 52 into engagement with the under side of the spring 50, presses the spring 50 upwardly, thereby serving to raise the beam 10 to position where it will be disposed above the pawls 28 to be supported thereby. These pawls are mounted on the guideway 43 and held yieldingly in position by springs 57. In this position the plow 14 will be supported until the obstruction has been passed or until desired by the operator, as the case may be.

Under ordinary conditions, the spring 15, with the assistance of the spring 16 will pull forwardly the carriage 13 and with it the plow 14, the wedges 27 on the carriage 13 engaging the pawls 28 to push the said pawls 28 out of contact with the beam 10 when the beam 10 will be pushed downwardly, not only by gravity, but by the spring 50 under the influence of the roller 58 mounted on the arm 59 which is pivoted to a member of the frame 42; this arm 59 being moved forwardly by the link 60 which connects the carriage 13 with the said arm 59. At the same time the arm 52 is moved forwardly as indicated in Fig. 1 of the drawings.

However, as has been stated, the plow 14 may be raised with the beam by disengaging the hook 23 from the companion hook 24 by a forward movement of the lever 33. This forward movement of the lever 33 serves to press the stop 30 rearwardly by means of the link 34. When the plow is raised under these conditions, the wedges 27 will not engage the pawls 28 on the forward movement of the carriage 13 until the lever 33 is again moved rearwardly to move the stop 30 forwardly, so that the wedges 27 may move forwardly and into engagement with the pawls 28 under the influence of the springs 61 which hold the wedges 27 yieldingly in the forward position in guideway 43.

As will be seen by referring to Fig. 4 of the drawings, I prefer to use two springs 15 and two springs 16; each of the springs 15 being mounted as has been described with its hook 23 for engaging a companion hook 24. The springs 16 are offset relatively to the springs 15, so that they will not interfere.

It will be understood that the relative positions of the coil springs 15 and 16 are not important and that, if desired, the springs may be disposed one inside of the other.

Having thus described my invention, I claim as new and desire to secure by Letters Patent:

1. In a yielding mount for plows and other tools, a frame, a plow movable longitudinally of the frame, resilient means for holding the plow yieldingly in operative position, means under the control of the operator during the operation of the tool to weaken the resilient means, and means to raise the plow relatively to the frame when it reaches a predetermined point in the retardation of its movement relatively to the forward movement of the frame.

2. In a yielding mount for plows and other tools, a frame, a plow movable relatively to the frame, resilient means for holding the plow yieldingly in operative position, means to weaken the resilient means at the will of the operator, a member for operating the second mentioned means during the operation of the tool, and means to raise the plow relatively to the frame when it reaches a predetermined point in the retardation of its movement relatively to the forward movement of the frame.

3. In a yielding mount for plows and other tools, a frame, a plow, means for holding the plow in operative position relatively to the frame, means to free the first means at the will of the operator, and means to raise the plow relatively to the frame when it reaches a predetermined point in the retardation of its movement relatively to the forward movement of the frame.

4. In a yielding mount for plows and other tools, a frame, a plow movable relatively to the frame, means to raise the plow relatively to the frame when it reaches a predetermined point in the retardation of its movement relatively to the forward movement of the frame and to lower the plow to operative position, means to hold the plow in operative position, and means operated at the will of the operator to free the second means to permit the portion of the first means to raise the plow and to prevent the operation of the first means to lower the plow to operative position.

5. In a yielding mount for plows and other tools, a frame, a plow movable longitudinally and vertically of the frame, means to raise the plow relatively to the frame when the frame advances to a predetermined point relatively to the plow, and means under the control of the operator to prevent under normal conditions the forward movement of the frame relatively to the plow.

6. In a yielding mount for plows and other tools, a frame, a plow movable longitudinally and vertically of the frame, means to raise the plow relatively to the frame when the frame advances to a predetermined point relatively to the plow, means to move the plow forward when raised relatively to the frame, and means under the control of the operator to prevent under normal conditions the forward movement of the frame relatively to the plow and to lower the plow to operative position.

7. In a yielding mount for plows and other tools, a frame, a beam pivoted to the frame, a carriage for supporting a plow slidable on the beam, means to raise the beam when the beam moves forwardly relatively to the plow to a predetermined point, and means under the control of the operator to prevent under normal conditions the forward movement of the beam relatively to the plow beyond a predetermined point.

8. In a yielding mount for plows and other tools, a frame, a beam pivoted to the frame, a carriage for supporting a plow, slidable on the beam, means to raise the beam when the beam moves forwardly with the frame to a predetermined point relatively to the carriage, and resilient means under the control of the operator to prevent the forward movement of the beam relatively to the carriage under normal conditions.

9. In a yielding mount for plows and other tools, a frame, a plow movable longitudinally of the frame, resilient means for holding the plow yieldingly in operative position, an additional resilient means for coöperating with the first resilient means for moving the plow forwardly, means to weaken the first resilient means at the will of the operator, and means to raise the plow relatively to the frame when it reaches a predetermined point in the retardation of its movement relatively to the forward movement of the frame.

10. In a yielding mount for plows and other tools, a frame, a beam movable vertically of the frame, a carriage for supporting a plow slidable on the beam, means to raise the beam when the beam moves forwardly with the frame to a predetermined point relatively to the carriage, resilient means for holding the carriage in forward operative position on the beam, means under the control of the operator to lessen the strength of the resilient means to permit the forward movement of the beam with the frame relatively to the carriage and to move the carriage forward when desired to operative position on the beam, and means to lower the beam to operative position when the carriage moves forward to operative position on the beam.

11. In a yielding mount for plows and other tools, a frame, a beam movable vertically on the frame, a carriage for supporting a plow, slidable longitudinally of the beam, means for moving the carriage forward into operative position on the beam, means to support the beam when raised, means to lower the beam when the carriage moves forward into operative position, and means under the control of the operator to permit the retardation of the carriage on the beam with the forward movement of the beam and to prevent the return movement of the carriage to operative position.

12. In a yielding mount for plows and other tools, a frame, a beam movable vertically on the frame, a carriage for supporting a plow, slidable longitudinally of the beam, means for raising the beam when the carriage reaches a predetermined rearward point on the beam, means for moving the carriage forward into operative position on the beam, and means for supporting the beam when raised, and means under the control of the operator to permit the retardation of the carriage on the beam with the forward movement of the beam and to release the third means.

13. In a yielding mount for plows and other tools, a frame, a beam movable vertically relatively to the frame, a carriage for supporting a plow, slidable longitudinally of the beam, means for moving the carriage forward into operative position on the beam, means for raising the beam when the carriage reaches a predetermined point on the beam, pawls for supporting the beam when raised upwardly, wedges on the carriage for engaging the pawls for moving the latter out of operative position, and means under the control of the operator to permit the retardation of the carriage on the beam with the forward movement of the beam and to hold the wedges out of operative position.

14. In a yielding mount for plows and other tools, a frame, a beam movable vertically relatively to the frame, a carriage for supporting a plow, slidable longitudinally of the beam, means for moving the carriage forward into operative position on the beam, means for raising the beam when the carriage reaches a predetermined point on the beam, pawls for supporting the beam when raised upwardly, wedges on the carriage for engaging the pawls for moving the latter out of operative position, a lever, means controlled by the lever to permit the retardation of the carriage on the beam with the forward movement of the beam, and additional means controlled by the lever to hold the wedges out of operative position.

15. In a yielding mount for plows and other tools, a frame, a longitudinally extending beam movable vertically on the frame, a carriage for carrying a plow slidable longitudinally on the beam, a spring for moving the carriage yieldingly forward on the beam, a second spring for holding the carriage yieldingly forward on the beam secured to the carriage and having a hook, a companion hook on the beam for engaging the first hook, means for raising the beam when the carriage reaches a predetermined rearward position thereon, pawls for holding the beam in raised position, wedges on the carriage for moving the pawls into inoperative position, means to move the wedges to inoperative position, a lever, and means by which the lever is adapted to operate the second mentioned hook and the second mentioned means.

16. In a yielding mount for plows and other tools, a frame, a longitudinally extending beam movable vertically on the frame, a carriage for carrying a plow, slidable longitudinally of the beam, a spring for moving the carriage yieldingly forward on the beam, a second spring for holding the carriage yieldingly forward on the beam secured to the carriage and having a hook, a sleeve on the carriage through which the spring extends, a cone on the beam, a companion hook in the cone for engaging the first mentioned hook, means for raising the beam when the carriage reaches a predetermined rearward position thereon, pawls for holding the beam in raised position, wedges on the carriage for moving the pawls into inoperative position, means to move the wedges to inoperative position, a lever, and means by which the lever is adapted to operate the second mentioned hook and the second mentioned means.

17. In a yielding mount for plows and other tools, a frame, a beam, a carriage mounted to slide longitudinally of the beam, means for automatically raising the beam on the movement of the carriage thereon, and means under the control of the operator to retard the movement of the carriage on the beam.

18. In a yielding mount for plows and other tools, a frame, a beam movable relatively to the frame, a carriage mounted to slide longitudinally on the beam, means for holding the beam relatively to the frame, means for releasing the second mentioned means on the movement of the carriage to a predetermined position on the beam, and means under the control of the operator to retard the movement of the carriage on the beam.

19. In a yielding mount for plows and other tools, a frame, a beam, a carriage mounted to slide on the beam to a position where it may rock thereon, resilient means for holding the carriage away from the said position, means for automatically moving the beam on the rocking of the carriage relatively to the beam, and means under the control of the operator to lessen the pull of the resilient means.

20. In a yielding mount for plows and other tools, a frame, a carriage movable longitudinally of the frame, means free from the ground for automatically raising the carriage on the movement of the latter longitudinally of the frame, and means under the control of the operator during the operation of the tool to retard the movement of the carriage relatively to the frame.

21. In a yielding mount for plows and other tools, a frame, a carriage, a beam on which the carriage is slidably mounted, the beam preventing the rotation of the carriage thereon in advance of a predetermined point, resilient means for yieldingly holding the carriage in advance of the said predetermined point, means for automatically raising the beam on the rearward movement of the carriage thereon, and means under the control of the operator during the operation of the tool for regulating the pull of the resilient means.

22. In a yielding mount for plows and other tools, a frame, a beam having two portions disposed at an angle to each other, a carriage slidably mounted on the beam for moving from one portion of the beam to the other portion, resilient means for yieldingly holding the carriage away from the apex of the angle, and means under the control of the operator during the operation of the tool for regulating the pull of the resilient means.

23. In a yielding mount for plows and other tools, a frame, a beam movable relatively to the frame, a carriage movably mounted on the beam, means for holding the beam rigidly relatively to the frame, means for releasing the first mentioned means on the movement of the carriage to a predetermined position on the beam, and means under the control of the operator during the operation of the tool to retard the movement of the carriage on the beam.

24. In a yielding mount for plows and other tools, a frame, a beam having a stop, a carriage slidably mounted on the beam and having a member for engaging the stop to serve as an axis of rotation on the movement of the member against the stop, resilient means for yieldingly holding the carriage with its member away from the stop, and means under the control of the operator during the operation of the tool for lessening the pull of the resilient means.

25. In a yielding mount for plows and other tools, a frame, a beam movable relatively to the frame, pawls for engaging the opposite sides of the beam to prevent its movement relatively to the frame, a carriage slidably mounted on the beam, resilient means for holding the carriage yieldingly relatively to the frame, means operable by the carriage for moving the pawls out of engagement with the beam, and means under the control of the operator during the operation of the tool to lessen the strength of the resilient means.

26. In a yielding mount for plows and other tools, a frame, a beam movable relatively to the frame, pawls for engaging opposite sides of the beam to prevent its movement relatively to the frame, a carriage slidably mounted on the beam, resilient means for holding the carriage yieldingly relatively to the frame, means operable by the carriage for moving the pawls out of engagement with the beam, means operable by the carriage for moving the beam relatively to the frame on the release of the beam by the said pawls, an additional pawl for supporting the beam on the frame after its said movement, means operable by the carriage for the release of the said additional pawl, and means under the control of the operator to lessen the pull of the resilient means and to throw the fourth means into inoperative position.

27. In a yielding mount for plows and other tools, a frame, a beam, a carriage mounted to slide longitudinally of the beam and depending therefrom, means for automatically raising the beam on the movement of the carriage relatively thereto, and means under the control of the operator during the operation of the tool to retard the movement of the carriage on the beam.

28. In a yielding mount for plows and other tools, a frame, a beam, a carriage depending therefrom and mounted to slide on the beam to a position where it may rock thereon, resilient means for holding the carriage away from the said position, means for automatically moving the beam on the rocking of the carriage relatively to the beam, and means under the control of the operator during the operation of the tool to lessen the strength of the resilient means.

29. In a yielding mount for plows and other tools, a frame, a beam movable relatively to the frame, a pawl on the frame for engaging the beam to hold the beam in a predetermined position, a carriage slidably mounted on the beam, means carried by the carriage for releasing the beam, resilient means for yieldingly holding the carriage in a predetermined position, and means under the control of the operator during the operation of the tool for throwing the first means into inoperative position and for regulating the strength of the resilient means.

30. In a yielding mount for plows and other tools, a frame, a beam movable relatively to the frame, a pawl on the frame for engaging the beam to hold the beam in a predetermined position, a carriage slidably mounted on the beam, means carried by the carriage for releasing the beam, resilient means for yieldingly holding the carriage in a predetermined position, and means under the control of the operator for throwing the first means into inoperative position.

31. In a yielding mount for plows and other tools, a frame, a beam movable relatively to the frame, a pawl on the frame for engaging the beam to hold the beam in a predetermined position, a carriage slidably mounted on the beam, means carried by the carriage for releasing the beam, and means under the control of the operator to throw the first means into inoperative position.

32. In a yielding mount for plows and other tools, a beam having a boss, a carriage slidable on the beam having a catch for positively engaging the boss, and means to free the catch when the beam is raised to a predetermined position.

33. In a yielding mount for plows and other tools, a frame, a beam having a boss and movable vertically on the frame, a carriage slidable on the beam and having a catch for positively engaging the boss, the catch being disposed to engage a member of the frame when the beam is raised.

34. In a yielding mount for plows and other tools, a frame, a beam having horizontal and vertical portions and provided with a boss at its vertical portion, a carriage slidable on the horizontal portion of the beam and adapted to swing upwardly from the beam's vertical portion, a catch on the carriage for positively engaging the boss, and means to free the catch when the beam is raised to a predetermined position.

35. In a yielding mount for plows and other tools, a frame, a plow, means for holding the plow in operative position relatively to the frame, means to free the first means at the will of the operator, means to raise the plow relatively to the frame when it reaches a predetermined point in the retardation of its movement relatively to the forward movement of the frame, and means to move the plow forward relatively to the frame in its raised position.

36. In a yielding mount for plows and other tools, a frame, a plow, means for holding the plow in operative position relatively to the frame, means to free the first means at the will of the operator, means to raise the plow relatively to the frame when it reaches a predetermined point in the retardation of its movement relatively to the forward movement of the frame, means to move the plow forward relatively to the frame in its raised position, and means to support the plow in said raised position.

37. In a yielding mount for plows and other tools, a frame, a plow, means for holding the plow in operative position relatively to the frame, means to free the first means, means to raise the plow relatively to the frame when it reaches a predetermined point in the retardation of its movement relatively to the forward movement of the frame, means to move the plow forward relatively to the frame in its raised position, means to support the plow in the said raised position, and means under the control of the operator for operating the second and fifth mentioned means.

ELON DUNLAP.

Copies of this patent may be obtained for five cents each, by addressing the "Commissioner of Patents, Washington, D. C."